W. Chesley,
Check Valve,
Nº 58,774   Patented Oct. 16, 1866.

Witnesses:
H. A. Beard
J. R. Paddock

Inventor:
William Chesley

UNITED STATES PATENT OFFICE.

WILLIAM CHESLEY, OF CINCINNATI, OHIO.

IMPROVEMENT IN GLOBE-VALVES.

Specification forming part of Letters Patent No. 58,774, dated October 16, 1866.

*To all whom it may concern:*

Be it known that I, WILLIAM CHESLEY, of Cincinnati, in the county of Hamilton and State of Ohio, have invented a new and useful Improvement in Check-Valves; and I do hereby declare the following to be a full, clear, and exact description of the same, reference being had to the accompanying drawings, making a part of this specification.

My improvement relates to all that class of check-valves which have an upper guide within a hub or cap for their valve-stems to work in; and my invention consists in so constructing that guide as to avoid the accumulations of dirt and grease in it, which accumulations, by adhering to the valve-stem whenever it is raised, prevent the return of the valve to its seat.

Figure 1:
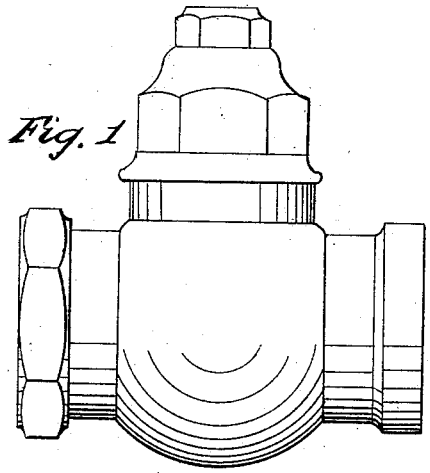
Figure 2:
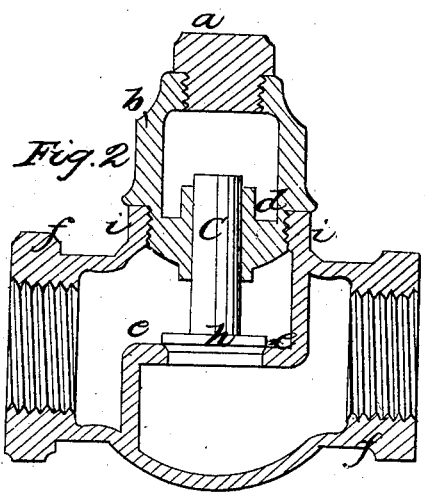
Figure 3:
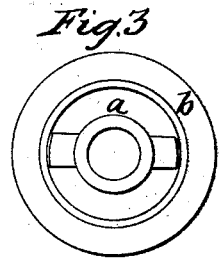

Figure 1 is a side elevation of a check-valve embodying my improvement. Fig. 2 is an axial section of the same. Fig. 3 is a cross-section of the hub or cap, showing the guide for the valve-stem.

F F represent the body of the valve. E E is the customary oblique diaphragm, with the usual circular opening, whose chamfered margin forms the seat of the valve $h$.

I is a raised rim, usually called the "boss," which is interiorly screw-threaded to receive the exterior thread of the hub or cap $b$.

D is a boss, connected with the interior of the hub $b$ at its sides by stays or wings, and having a cylindrical perforation its entire length, which serves as a guide for the valve-stem C.

A is a plug, which may be removed for the purpose of regrinding the valve, which can be accomplished by means of a screw-driver inserted in the slot provided in the top of valve-stem.

In the ordinary check-valve of this class the guide is constructed by connecting a boss with the inside of a hub at its top only, projecting it downward, forming a cylindrical chamber open only at the bottom for the valve-stem to work in and be guided by. After being in use a short time a portion of the dirt and grease passing through the valve collects in the chamber, and, having no outlet at the top, accumulates there, forming a stiff adhesive compound, which, by firmly adhering to the valve-stem when raised in contact with it, prevents the return of the valve to its seat.

Instead of the above arrangement, I construct the guide by connecting the boss with the interior of the hub at its side only by lateral wings or stays, leaving the top entirely clear, so that when drilled through its entire length it forms a cylindrical chamber, open at both ends, permitting any grease or dirt that may collect to escape at the top and be carried off through the valve.

I have selected to illustrate my invention the globe form of check-valve, with which I have put it in successful operation, but do not design to restrict my invention to any particular form of check-valve, or to any particular number of lateral stays or wings to support the boss forming the guide, as the principle is applicable to any check-valve having an upper guide within a hub or cap, and as any number of wings desired may be used to support the boss.

I claim herein as new and of my invention—

The construction and arrangement of the boss $d$, cap $b$, and plug $a$ with reference to the valve-stem C, for the purpose and as herein set forth.

WILLIAM CHESLEY.

Witnesses:
J. R. PADDOCK,
W. A. BEARD.